US012013663B2

(12) United States Patent
Cusin et al.

(10) Patent No.: US 12,013,663 B2
(45) Date of Patent: Jun. 18, 2024

(54) RIGID HOROLOGICAL COMPONENT FOR AN OSCILLATOR MECHANISM OR FOR AN ESCAPEMENT MECHANISM AND HOROLOGICAL MOVEMENT INCLUDING SUCH A COMPONENT

(71) Applicant: Nivarox-FAR S.A., Le Locle (CH)

(72) Inventors: Pierre Cusin, Villars-Burquin (CH); Christian Charbon, Chézard-St-Martin (CH)

(73) Assignee: NIVAROX-FAR S.A., Le Locle (CH)

( * ) Notice: Subject to any disclaimer, the term of this patent is extended or adjusted under 35 U.S.C. 154(b) by 285 days.

(21) Appl. No.: 17/113,702

(22) Filed: Dec. 7, 2020

(65) Prior Publication Data

US 2021/0191327 A1 Jun. 24, 2021

(30) Foreign Application Priority Data

Dec. 20, 2019 (EP) .................................... 19218831

(51) Int. Cl.
*G04B 15/14* (2006.01)
*G04B 13/00* (2006.01)
*G04B 17/32* (2006.01)

(52) U.S. Cl.
CPC ............. *G04B 15/14* (2013.01); *G04B 13/00* (2013.01); *G04B 17/32* (2013.01)

(58) Field of Classification Search
CPC ......... G04B 15/14; G04B 13/00; G04B 17/32
(Continued)

(56) References Cited

U.S. PATENT DOCUMENTS

2010/0214880 A1* 8/2010 Rappo .................. G04D 3/0074 216/99
2014/0080378 A1* 3/2014 Wasynczuk ............. C23C 18/54 442/379

(Continued)

FOREIGN PATENT DOCUMENTS

CN 109716245 A 5/2019
EP 3 006 605 A1 4/2016

(Continued)

OTHER PUBLICATIONS

European Search Report of EP 19 21 8831.6 dated Jun. 11, 2020.

(Continued)

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A rigid horological component (6, 7, 8) for an oscillator mechanism or for an escapement mechanism of a horological movement, the component extending along a principal plane (P) and including at least a part made of a composite material (1), the composite material (1) including a matrix (2) and a multitude of nanotubes or nanowires (3) distributed in the matrix (2), the nanotubes or nanowires (3) being juxtaposed and disposed substantially parallel with an axis (A) substantially perpendicular to the plane (P) of the component, the matrix (2) includes a rigid material (4) to fill the interstices and join the nanotubes or nanowires (3) to one another, the material (4) having rigid mechanical properties to block the elastic deformation of the component, the rigid material (4) comprised in the component having a Young's modulus greater than 2 GPa.

14 Claims, 2 Drawing Sheets

(58) Field of Classification Search
USPC .......................................................... 368/131
See application file for complete search history.

(56) References Cited

U.S. PATENT DOCUMENTS

| | | | | |
|---|---|---|---|---|
| 2014/0319741 | A1 | 10/2014 | Poffet et al. | |
| 2014/0355395 | A1 | 12/2014 | Avril et al. | |
| 2017/0298528 | A1* | 10/2017 | Marlot Doerr | C10M 103/04 |
| 2018/0157214 | A1 | 6/2018 | Perret | |
| 2018/0217561 | A1* | 8/2018 | Isshiki | H10K 59/60 |
| 2018/0327919 | A1* | 11/2018 | Kim | F16F 1/06 |
| 2019/0212702 | A1* | 7/2019 | Semon | G04B 17/066 |

FOREIGN PATENT DOCUMENTS

| | | | |
|---|---|---|---|
| FR | 3 052 881 | A1 | 12/2017 |
| JP | 2007-533973 | A | 11/2007 |
| JP | 2008-116205 | A | 5/2008 |
| JP | 2014-531600 | A | 11/2014 |
| JP | 2015-500474 | A | 1/2015 |
| JP | 2017-205868 | A | 11/2017 |
| JP | 2018-193607 | A | 12/2018 |
| JP | 2019-518965 | A | 7/2019 |
| KR | 10-2014-0068262 | A | 6/2014 |
| KR | 10-2019-0020031 | A | 2/2019 |
| WO | 2005/040943 | A2 | 5/2005 |
| WO | 2011/031959 | A1 | 3/2011 |
| WO | 2019/043432 | A1 | 3/2019 |

OTHER PUBLICATIONS

Communication issued Nov. 18, 2021 from the China National Intellectual Property Administration in Chinese Application No. 202011502791.X.

* cited by examiner

RIGID HOROLOGICAL COMPONENT FOR AN OSCILLATOR MECHANISM OR FOR AN ESCAPEMENT MECHANISM AND HOROLOGICAL MOVEMENT INCLUDING SUCH A COMPONENT

CROSS REFERENCE TO RELATED APPLICATIONS

This application is claiming priority based on European Patent Application No. 19218831.6 filed on Dec. 20, 2019.

FIELD OF THE INVENTION

The present invention relates to rigid horological components for an oscillator mechanism or for an escapement mechanism of a horological movement.

The invention also relates to a horological movement including such a component.

BACKGROUND OF THE INVENTION

Horological movements generally comprise an escapement mechanism and a mechanical oscillator mechanism. The escapement mechanism particularly includes a pallet assembly and an escapement wheel, whereas the oscillator mechanism comprises for example a spiral spring associated with an oscillating inertia-block referred to as a balance.

Technical progress in composite materials now makes it possible to manufacture certain components in innovative and high-performance materials, which make it possible to do away, at least in part, with metallic materials. At the present time, the use of nanotubes or nanowires, for example, for manufacturing components is being tried. Such materials with nanotubes or nanowires offer advantages in terms of light weight and strength. Thus, the document JP2008116205A describes a spiral spring comprising a graphite and amorphous carbon matrix, reinforced by carbon nanotubes which are dispersed in the matrix and aligned in the longitudinal direction of the spiral.

However, some components, such as an escapement wheel or pallet assembly, require a high level of rigidity, in particular for the horological movement to be precise. However, the components described in this documents are not suitable for producing rigid elements, but merely flexible components for making springs.

SUMMARY OF THE INVENTION

An aim of the invention is hence that of providing a rigid horological component, which avoids the problems cited above.

For this purpose, the invention relates to a rigid horological component for an oscillator mechanism or for an escapement mechanism of a horological movement, the component extending along a principal plane and including at least a part made of a composite material.

The component is remarkable in that the composite material comprises a matrix and a multitude of nanotubes or nanowires distributed in the matrix, the nanotubes or nanowires being juxtaposed and disposed substantially parallel with an axis substantially perpendicular to the plane of the component, the matrix including a rigid material to fill the interstices and join the nanotubes or nanowires to one another, the material having rigid mechanical properties for blocking an elastic deformation of the component.

Thus, thanks to such a rigid component, it is possible to produce certain elements of a horological movement, which must prevent any deflection, such as an escapement wheel or pallet assembly, while having the advantages of composite materials based on nanotubes or nanowires. The advantages offered by these composite materials are, besides light weight, the possibility of using oxidation-resistant materials which can be self-lubricating. It is also possible to vary the infiltration rate of the rigid material to lighten the component further or render it porous, particularly for self-lubrication.

According to an advantageous embodiment, the rigid material comprised in the component has a Young's modulus greater than 2 GPa.

According to an advantageous embodiment, the nanotubes are made of carbon.

According to an advantageous embodiment, the nanotubes are multi-walled.

According to an advantageous embodiment, the nanowires are made using an element to be selected particularly from the following list: gold, silicon, silicon oxide, boron nitride, gallium nitride, silicon nitride, zinc oxide, gallium arsenide, tungsten sulphide, silver, copper, manganese arsenide, indium arsenide, carbon, diamond.

According to an advantageous embodiment, the nanotubes or nanowires have a diameter within a range ranging from 2 to 50 nm, preferably within a range ranging from 3 to 15 nm, or from 5 to 10 nm.

According to an advantageous embodiment, the nanotubes or nanowires have a length within a range ranging from 100 to 500 microns, preferably within a range ranging from 100 to 300 microns, or from 150 to 200 microns.

According to an advantageous embodiment, the rigid material is made using an element to be selected from the following list: tungsten, organic materials such as parylene, hexagonal boron nitride, $Al2O3$ type monocrystalline ruby, diamond, tungsten or molybdenum disulphides, graphite, lead, silicon carbide, nickel, indium phosphide, titanium oxide, silicon, silicon oxide, carbon.

According to an advantageous embodiment, the component is an escapement mechanism pallet assembly.

According to an advantageous embodiment, the component is an escapement mechanism wheel.

According to an advantageous embodiment, the component is a horological movement train.

According to an advantageous embodiment, the component is an oscillator mechanism balance.

The invention also relates to a horological movement comprising a rigid horological component according to the invention.

BRIEF DESCRIPTION OF THE DRAWINGS

Further features and advantages of the present invention will emerge on reading several embodiments given merely by way of non-limiting examples, with reference to the appended drawings wherein.

DETAILED DESCRIPTION OF PREFERRED EMBODIMENTS

In the description, we describe rigid components for a horological movement. The component is, for example, to be selected from a list comprising an escapement mechanism pallet assembly, an escapement mechanism wheel, a horological movement train, or an oscillator mechanism balance.

Figure 1:
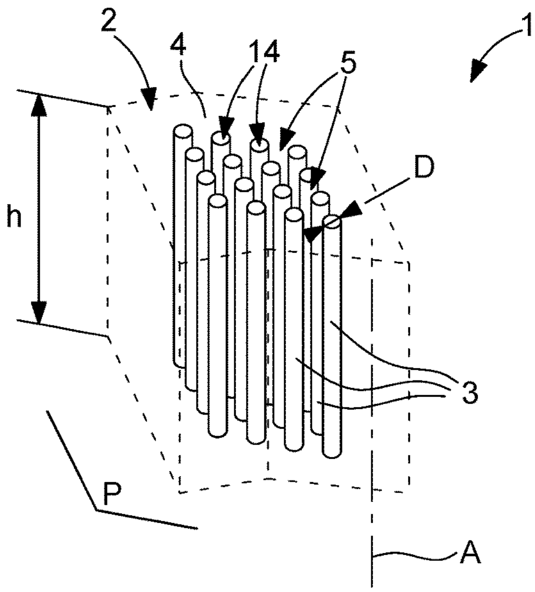
FIG. 1 schematically represents a through perspective view of a composite material according to the invention, FIG. 2 schematically represents a cross-sectional view of the composite material during the method for manufacturing the first embodiment of the invention, FIG. 3 schematically represents a top view of an escapement mechanism pallet assembly, FIG. 4 schematically represents a top view of an escapement mechanism wheel according to the invention, and FIG. 5 schematically represents a perspective view of an oscillation mechanism balance.

The rigid component is preferably flat and extends along a principal plane P. The component includes at least a part made of a composite material 1, represented in FIG. 1. Preferably, the component is made entirely of this composite material 1. Thus, the components from the preceding list can be made of this composite material 1.

The composite material 1 comprises a matrix 2 and a multitude of nanotubes or nanowires 3 distributed in said matrix 2. The component has, for example, a generally flat shape extending along a plane P.

The nanotubes or nanowires 3 form a structure of the composite material 1, wherein they are juxtaposed and disposed substantially parallel with one another. They are substantially perpendicular to the plane P of the component. The term nanotube denotes tubes wherein the inside is generally hollow, whereas nanowires are generally solid tubes.

The nanotubes or nanowires 3 are disposed substantially parallel with an axis A, perpendicular to the plane P of the component. They are evenly distributed so as to be spaced apart homogeneously in the matrix 2. Advantageously, the composite material is embodied such that nanotubes or nanowires 3 are present in the entire mass of the matrix 2.

The nanotubes or nanowires 3 have, for example, a diameter D within a range ranging from 2 to 50 nm. Preferably, the nanotubes or nanowires 3 have a diameter within a range ranging from 3 to 15 nm, or from 5 to 10 nm.

The nanotubes or nanowires 3 can have a length L within a range ranging from 100 to 500 microns. Preferably, the nanotubes or nanowires 3 can have a length within a range ranging from 100 to 300 microns, or from 150 to 200 microns.

In a first embodiment, the composite material includes nanotubes 3 made of carbon. The carbon nanotubes 3 are generally multi-walled, but can also be optionally single-walled.

According to a second embodiment, the composite material includes nanowires 3 made at least in part using an element to be selected from the following list: gold, silicon, boron nitride, gallium nitride, silicon oxide, silicon nitride, zinc oxide, gallium arsenide, tungsten sulphide, silver, copper, manganese arsenide, indium arsenide, carbon, diamond.

The matrix 2 includes a material 4 to fill the interstices and join the nanotubes or nanowires 3 to one another. The material 4 can advantageously include the nanotubes or nanowires 3, by being injected into the interstices 5 between the nanotubes or nanowires 3. This material 4 helps provide cohesion between the nanotubes or nanowires 3 and thus modify the mechanical properties of all of the nanotubes or nanowires 3, in particular to render the matrix rigid. In the first embodiment of the nanotubes, the material 4 can also be arranged inside 14 the nanotubes 3.

According to the invention, the material 4 is rigid, the material 4 having rigid mechanical properties to block an elastic deformation of the component. Thus, thanks to this rigid material 4, specific components of the horological mechanism can be embodied. The rigid material 4 comprised in the component has for example a Young's modulus greater than 2 GPa. The component 4 can also be rigid thanks to the dimensions thereof, for example by selecting a sufficient thickness preventing the deformation thereof.

For both embodiments, the rigid material 4 forming the matrix 2 is made using an element from the following list: tungsten, organic materials such as parylene, hexagonal boron nitride, Al2O3 type monocrystalline ruby, diamond, tungsten or molybdenum disulphides, graphite, lead, silicon carbide, nickel, indium phosphide, titanium oxide, silicon, silicon oxide, carbon. The rigid materials 4 can advantageously also consist of carbon.

Figure 3:
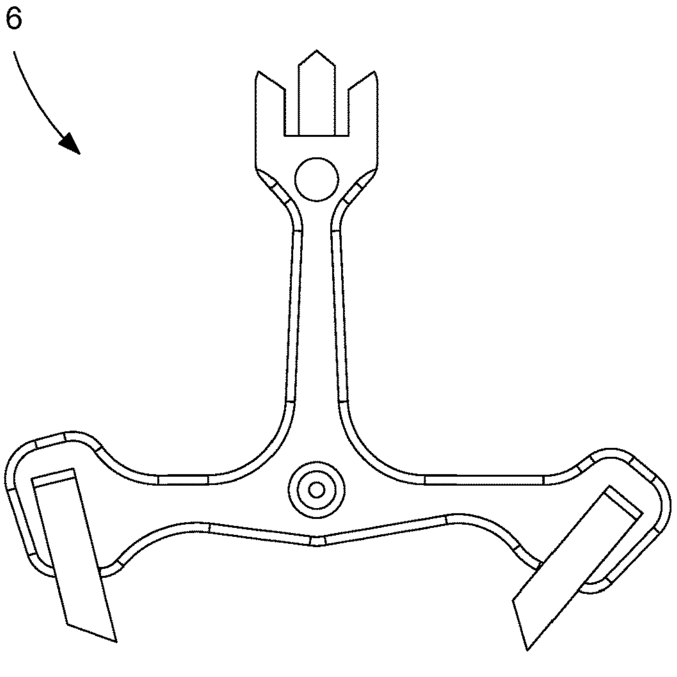
Figure 4:
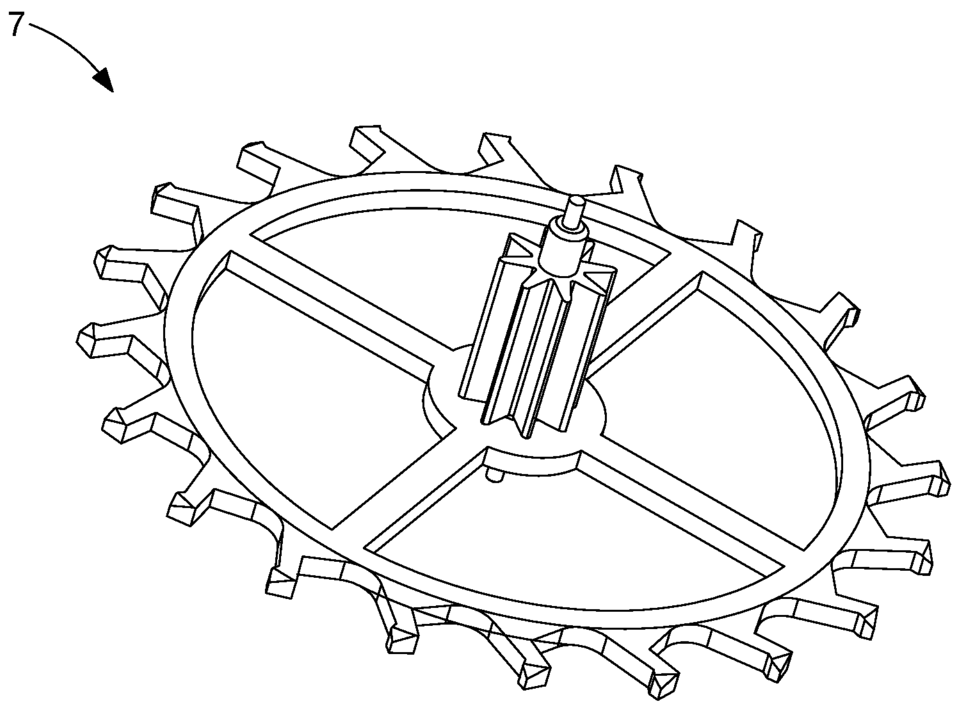
Figure 5:
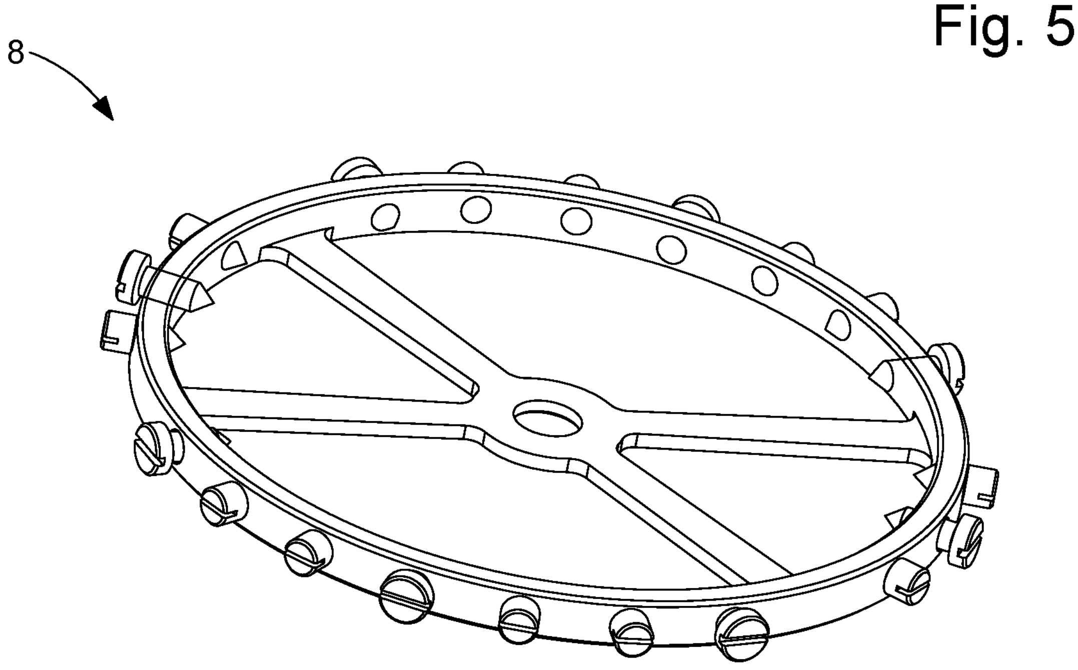

Thus, the horological components can benefit from the advantages of the composite materials based on nanotubes or nanowires, while retaining a high level of rigidity essential for this type of component. FIG. 3 represents an escapement mechanism pallet assembly 6 made with a composite material according to the invention. FIG. 4 represents an escapement wheel 7 made from such a composite material. Finally, the balance 8 of FIG. 5 is also made from such a composite material.

To manufacture the components of the first embodiment with the carbon nanotubes, a method comprising the following steps is used, for example:

- a first step of preparing a substrate, for example a silicon substrate, preferably by photolithography, so that the nanotube forest growth occurs at a specific location corresponding to the shape of the component sought. Thus, a pallet assembly, wheel or balance shape is designed by photolithography.
- a second step of growing the nanotubes or nanowires on the substrate, not shown in the figures, preferably with a catalyst, for example iron,
- a third step of infiltrating the rigid constituent material of the matrix in the nanotube or nanowire distribution, and
- a fourth step of detaching the component from the substrate.

An example of the first and second steps is found in the document "Mechanical and electrical properties of carbon-nanotube-templated metallic microstructures" (Richard Scott Hansen June 2012).

During the second step, the nanotubes 16 or nanowires are grown parallel with an axis substantially perpendicular to the substrate.

Figure 2:
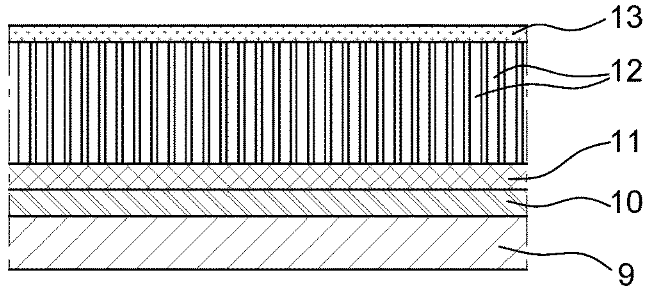

In FIG. 2, the substrate 9 is coated with a layer of silica 10, and a layer of catalyst 11, for example iron. The carbon nanotubes 12 are formed on the layer of catalyst 11 by growth.

Upstream from the second step, additional nanotubes can be mixed in a solvent and dispersed on the layer of catalyst, for example by ultrasound, to define a top layer of nanotubes. This top layer 13 of nanotubes is porous so that the carbon (or other material) forming the nanotubes 12 can be deposited therethrough, such that the nanotubes 12 grow under the top layer 13. Thus, regular and homogeneous growth of the nanotubes 12 is ensured so that they all have substantially the same length. The third step is also performed through the top layer 13 of nanotubes 12, thanks to the porosity thereof. The detachment is preferably performed by wet or vapour phase etching, for example by means of hydrogen fluoride HF.

As regards the manufacture of the nanowires of the second embodiment, conventional techniques associated with the material selected in the list are used. Thin layer deposition is preferably used, for example by CVD (Chemical Vapour Deposition) type chemical deposition or by PVD (Physical Vapour Deposition) type physical deposition. As in the first embodiment, photolithography methods are used to select the locations of a substrate, for example made of silicon, where the nanowires are grown. The rigid material is infiltrated between the nanowires. Finally, the component is detached from the substrate once it is complete.

Naturally, the invention is not limited to the embodiments described with reference to the figures and alternative embodiments could be envisaged without leaving the scope of the invention.

The invention claimed is:

1. A rigid horological component for an oscillator mechanism or for an escapement mechanism of a horological movement, the component extending along a principal plane and including at least a part made of a composite material, wherein the composite material comprises a matrix and a multitude of nanowires distributed in the matrix, the nanowires being juxtaposed and disposed substantially parallel with an axis substantially perpendicular to the plane of the component, the matrix including a rigid material to fill the interstices and join the nanowires to one another, the rigid material having rigid mechanical properties to block the elastic deformation of the component, the rigid material comprised in the component having a Young's modulus greater than 2 GPa.

2. The component according to claim 1, wherein the nanowires are made using an element to be selected from the following list: gold, silicon, boron nitride, gallium nitride, silicon oxide, silicon nitride, zinc oxide, gallium arsenide, tungsten sulphide, silver, copper, manganese arsenide, indium arsenide, carbon, diamond.

3. The component according to claim 1, wherein the nanowires have a diameter within a range ranging from 2 to 50 nm.

4. The component according to claim 1, wherein the nanowires have a length within a range ranging from 100 to 500 microns.

5. The component according to claim 1, wherein the rigid material is made using an element to be selected from the following list: tungsten, organic materials such as parylene, hexagonal boron nitride, Al2O3 type monocrystalline ruby, diamond, tungsten or molybdenum disulphides, graphite, lead, silicon carbide, nickel, indium phosphide, titanium oxide, silicon, silicon oxide, carbon.

6. The component according to claim 1, wherein the component is an escapement mechanism pallet assembly.

7. The component according to claim 1, wherein the component is an escapement mechanism wheel.

8. The component according to claim 1, wherein the component is a horological movement train.

9. The component according to claim 1, wherein the component is an oscillator mechanism balance.

10. A horological movement, wherein it comprises a rigid horological component according to claim 1.

11. The component according to claim 3, wherein the nanowires have a diameter within a range ranging from 3 to 15 nm.

12. The component according to claim 11, wherein the nanowires have a diameter within a range ranging from 5 to 10 nm.

13. The component according to claim 4, wherein the nanowires have a length within a range ranging from 100 to 300 microns.

14. The component according to claim 13, wherein the nanowires have a length within a range ranging from 150 to 200 microns.

* * * * *